US010421386B2

(12) United States Patent
Sauerwald

(10) Patent No.: US 10,421,386 B2
(45) Date of Patent: Sep. 24, 2019

(54) TIE DOWN STRAP WITH STRAP LOOP FOR PREVENTING DISENGAGEMENT WHILE SECURING CARGO

(71) Applicant: Skellen Enterprises, LLC, Harleysville, PA (US)

(72) Inventor: Kevin Scott Sauerwald, Harleysville, PA (US)

(73) Assignee: Skellen Enterprises LLC, Harleysville, PA (US)

( * ) Notice: Subject to any disclaimer, the term of this patent is extended or adjusted under 35 U.S.C. 154(b) by 0 days.

(21) Appl. No.: 15/408,413

(22) Filed: Jan. 17, 2017

(65) Prior Publication Data

US 2018/0154818 A1    Jun. 7, 2018

Related U.S. Application Data

(60) Provisional application No. 62/279,514, filed on Jan. 15, 2016.

(51) Int. Cl.
*B60P 7/08* (2006.01)
*B60R 9/00* (2006.01)
(Continued)

(52) U.S. Cl.
CPC ............... *B60P 7/0823* (2013.01); *B60P 3/00* (2013.01); *B60P 7/06* (2013.01); *B60P 7/08* (2013.01);
(Continued)

(58) Field of Classification Search
CPC ..... B60P 7/0823; B60P 7/0807; B60P 7/0896; B60P 3/00; B60P 7/06; B60P 7/08; B60P 7/0869; A44B 11/04; B65D 63/1018; B65D 2313/02; Y10T 24/3987; B60R 9/00
USPC ... 410/10–12, 20, 21, 23, 96–100, 102, 106, 410/110, 116; 24/265 CD, 306, 442, 302, 24/265 H, 68 CD; 248/499
See application file for complete search history.

(56) References Cited

U.S. PATENT DOCUMENTS 2,372,967 A    4/1945   Martin
4,096,807 A    6/1978   Woodward
(Continued)

*Primary Examiner* — Stephen T Gordon
(74) *Attorney, Agent, or Firm* — Pearson IP; Loren Donald Pearson

(57) ABSTRACT

A strap assembly device is used to maintain engagement between the strap and the strap anchor point. The strap assembly device works by creating a loop to prevent the fastening hook on the strap from slipping. The strap assembly device is looped through a strap anchor point and the fastening hook is engaged to the anchor point. A portion of the strap extends beyond the fastening hook through the anchor point. The strap creates a loop by using a fastening system. The fastening system is generated by a male and female portion being joined. Either the male or female portion of the fastening system is located on the medial portion of the strap (portion before the hook). The other portion of the fastening system, male or female, is located on the lateral portion of the strap (portion extending beyond the hook). Once the fastening hook is engaged with the strap anchor point on the vehicle, the male and female portions of the fastening systems are joined. This union of the male and female fastening systems disallows the fastening hook from becoming disengaged from the strap anchor point.

12 Claims, 3 Drawing Sheets

(51) Int. Cl.
*B60P 3/00* (2006.01)
*B60P 7/06* (2006.01)

(52) U.S. Cl.
CPC ............ *B60P 7/0807* (2013.01); *B60P 7/0869* (2013.01); *B60R 9/00* (2013.01)

(56) References Cited

U.S. PATENT DOCUMENTS

| | | | |
|---|---|---|---|
| 4,850,769 A | | 7/1989 | Irvin |
| 5,391,030 A | * | 2/1995 | Lee ...................... A61G 3/0808 410/12 |
| 5,452,973 A | | 9/1995 | Arvin |
| 5,603,591 A | * | 2/1997 | McLellan ............. B60P 7/0823 410/96 |
| 5,800,106 A | | 9/1998 | Miller |
| 5,876,167 A | | 5/1999 | Selby |
| 5,915,900 A | | 6/1999 | Boltz |
| 6,017,174 A | | 1/2000 | Ross et al. |
| 6,039,521 A | | 3/2000 | Sullivan |
| 6,152,664 A | | 11/2000 | Dew et al. |
| 6,783,311 B2 | | 8/2004 | Sauerwald |
| 6,808,346 B2 | | 10/2004 | Zhan et al. |
| 6,896,458 B1 | * | 5/2005 | Romero ................ B60P 7/0823 410/100 |
| 7,249,920 B2 | | 1/2007 | Early et al. |
| 7,390,155 B1 | | 6/2008 | Diaz et al. |
| 7,901,168 B2 | | 3/2011 | Fa-Kouri |
| 8,882,417 B2 | | 11/2014 | Sauerwald |
| 2001/0046424 A1 | | 11/2001 | McDonald |
| 2002/0006317 A1 | | 1/2002 | Hoffman et al. |
| 2009/0269156 A1 | * | 10/2009 | Siegenthaler ......... B60P 7/0815 410/116 |
| 2011/0211930 A1 | | 9/2011 | Digman |

* cited by examiner

TIE DOWN STRAP WITH STRAP LOOP FOR PREVENTING DISENGAGEMENT WHILE SECURING CARGO

CROSS-REFERENCE TO RELATED APPLICATIONS

This application claims the benefit of U.S. Provisional Application No. 62/279,514, filed Jan. 15, 2016.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The field of the invention is cargo straps, and, more particularly, cargo straps with devices for maintaining attachment of the cargo straps to anchor points.

Description of the Related Art

Tensioning systems utilize webbing, a ratcheting device, and a hook to secure carbo to a vehicle bed. These tensioning systems are commonly known as "tie down straps". Typically, a tie down strap includes a length of material with a hook at each end of the strap. The strap lies over cargo and the hooks attach to anchor points. A tie down strap can include a tensioner for tightening the strap. The size and shape of the tie down strap is chosen based on the cargo to be held. The strap can be a ribbon, a rope, a chain, a net, or the like. Examples of connectors are s-hooks, wire hooks, flat hooks, or the like. Tensioners are devices that create tension in the strap between the anchors in order to hold the cargo underlying the strap. Examples of tensioners are buckles, bungee chords, ratchets, turnbuckles, cable tensioners, and the like.

Tie down straps secure cargo to beds of trucks. The bed has two anchors and a surface between the anchors. The cargo rests on the surface. Each hook of the tie down strap connects to a respective anchor. The strap overlies the cargo. The tensioner creates tension on the strap between the two anchors, which causes the strap to press the cargo against the surface of the bed.

Truckers complain that, during installation, tie down straps become accidentally disengaged from a first anchor whenever tension in the strap on the first anchor is lost before the strap is connected to the second anchor and the overall cable is not yet tensioned. The following example illustrates the problem. A trucker securing cargo onto the bed of a truck will connect a hook at a first end of a tie down strap to a first anchor on a first side of the bed. Next, the trucker tosses the second end of the tie down strap over the cargo. Then, before the trucker can circumambulate the bed and attach the second hook to the second anchor, the weight of the first hook detaches the first hook from the first anchor as the hook falls without the strap being tensioned. To prevent the first hook from detaching from the first anchor, the trucker must tense the segment of the strap connected to the first hook continuously throughout the attachment of the second hook to the second anchor and the tensioning of the strap between the two anchors. The issue worsens when the cargo is taller than the reach of the trucker. When the cargo is taller, the trucker usually requires an assistant, uses a tool for reaching, or climbs over the cargo.

Because trucking by its nature involves shipping cargo over distances via trucks driven a lone operator, the lone operator often needs to attach, reattach, or supplement tie down straps during a trip without the help of an additional person.

Accordingly, a need exists for a solution that prevents a first hook from detaching during installation of tie down straps. In addition, the solution needs to work in cases where the cargo is taller than the user's reach. Finally, the solution needs to be workable by a single person.

Early et al, U.S. Pat. No. 7,249,920, teaches a strapping retainer for lading and a method for using the strapping retainer. The strapping retainer reduces the amount of strapping slippage in tie down straps securing cargo in railroad cars. The strapping retainer is used to attach a strap to the lateral wall of a cargo container. Early et al. '920 does not teach to use the device in situations where a tie down strap is tensioned over a cargo container. With particular reference to FIGS. 9-10 of Early et al. '920, the weight of the strapping retainer (10), would still cause the strapping retainer to fall when tension on the strapping (24) is not maintained throughout installation. As the strapping retainer would fall, the loose end (42) eventually pulls through the tie bar (40). After the loose end pulls through, the strapping retainer can slide off the strapping. Then, without the strapping retainer, the strapping would be free to pull through the tie bar. Accordingly, Early et al. '920 is not able to solve the detachment issues discussed previously.

BRIEF SUMMARY OF THE INVENTION

A tie down strap includes a strap loop for maintaining connection between the tie down strap and the anchor of a bed for supporting cargo. The tie down strap includes a medial strap, a hook, and a lateral strap. The medial strap is used to overly the cargo. The hook is attached to the medial strap. The hook is used to attach releasably to an anchor of a bed. The hook is not closed so if tension on the medial strap is lost, the hook detaches from the anchor without more. The lateral strap has a first end and a second end. The lateral strap is threaded through the anchor and each end is attached to the medial strap to form a strap loop. The strap loop prevents the hook from detaching from the anchor in case the medial strap loses tension.

The strap loop is formed by a lateral strap that is joined at each of its ends to the medial strap. The lateral strap can be permanently fixed at one end to the medial strap. Alternatively, the lateral strap can be releasably attached at both ends to the medial strap. a fastening system for holding the fastening hook to the anchor point on the vehicle once paired.

The lateral strap can attach at one end or both ends to the medial strap with a connector. The connector can be a hook and loop fastener. The connector can be other fasteners such as buttons, snaps, zippers, and the like.

The strap loop provides extra security when using tie down straps. The strap loop secures the strap to prevent the strap from flapping in the wind while driving, even in the event the fastening hook decouples. The advent of the strap loop secures the excess strap that previous tie down straps allowed to dangle. Securing of the strap provides a more fortified holding on the cargo.

A further object of the invention is to provide a strap loop that is easier to attach to the anchor than the medial strap. The lateral strap and its connectors do not need to be strong enough to support the load of the cargo. The lateral strap and its connectors only need to be strong enough to support the weight of the medial strap and the hook until the medial strap is tensed.

In accordance with a further object of the invention, a method is taught for preventing a connector of a tie down strap from detaching from an anchor while securing cargo to a bed. The method includes connecting a hook to a hole formed through the anchor. The next step is threading a lateral strap through the hole formed in the anchor. The next step is closing a loop through the hole formed in the anchor by connecting the lateral strap to a medial strap. The medial strap is connected to the hook. The next step is placing the medial strap over the cargo after closing the loop through the holed formed in the anchor.

The method can further include connecting a further hook to a hole in a further anchor, after placing the medial strap over the cargo. The further anchor is disposed on an opposing side of the bed from the anchor. The next step is tensioning the medial strap between the anchor and the further anchor after connecting the further hook to the hole in the further anchor.

Other features of the invention are set forth in the appended claims.

Although the invention is illustrated and described herein as embodied in a strap assembly, the invention is not limited to the details shown because various modifications and structural changes may be made without departing from the invention and the equivalents of the claims. However, the construction and method of operation of the invention together with additional objects and advantages thereof will be best understood from the following description of specific embodiments when read in connection with the accompanying drawings.

DETAILED DESCRIPTION OF THE INVENTION

Figures 1, 2:
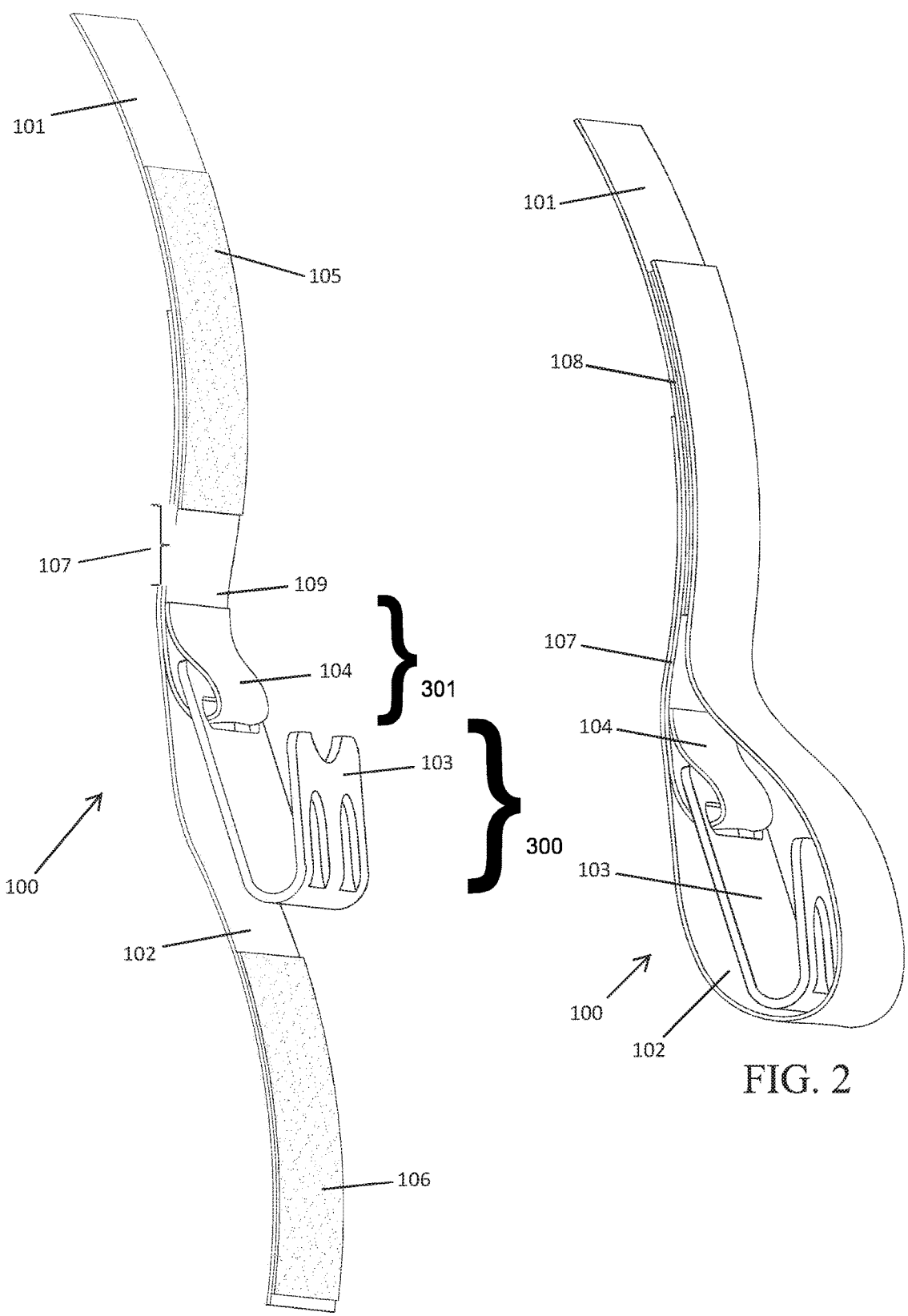
FIG. 1 is a diagrammatic perspective view of an open strap assembly according to the invention.
FIG. 2 is a perspective view of the strap assembly shown in FIG. 1 in a closed position.

Embodiments of the invention are described below and are shown in the figures of the drawing.

FIG. 1 shows a preferred embodiment of a tie down strap 100 in an opened position. The tie down strap 100 includes a medial strap 101 and a lateral strap 102. The medial strap 101 and lateral strap 102 are attached by way of a shared edge 107.

The tie down strap 100 includes one part of a hook and loop fastener 105 on the medial strap 101 and a complementary part of the hook and loop fastener 106 on the lateral strap 102. The tie down strap 100 includes a fastening hook 103 to secure tie down strap 100. The fastening hook 103 is attached to the tie down strap 100 with a hook loop 104. The hook loop 104 keeps the fastening hook 103 at the lateral end 109 of the medial strap 101. The lateral strap 102 extends beyond the fastening hook 103. The lateral strap 102 is attached to the medial strap 103 by a shared edge 107 to prevent the lateral strap 102 and medial strap 103 from detaching.

The fastening hook 103 has a lip with a height 300. The hook loop 104 has a diameter 301. The diameter 301 of the hook loop 104 is less than the height 300 of the lip of the fastening hook.

FIG. 2 shows the tie down strap 100 in a closed position. The hook and loop fastener 105 on the medial strap 103 the hook and loop fastener 106 is secured to the lateral strap 102.

The tie down strap 100 uses the hook and loop fastener secured to the medial strap 105 and the hook and loop fastener secured to the lateral strap 106 to create a shared edge 108. This shared edge 108 creates shearing force to maintain the fastening hook 103 in a secured position. The combination of the shared edge 108 and the shared edge 107 creates a looping tie down strap 100 preventing slippage of the fastening hook 103 from the anchor point 201 (which is shown in FIGS. 3-5).

Figure 3:
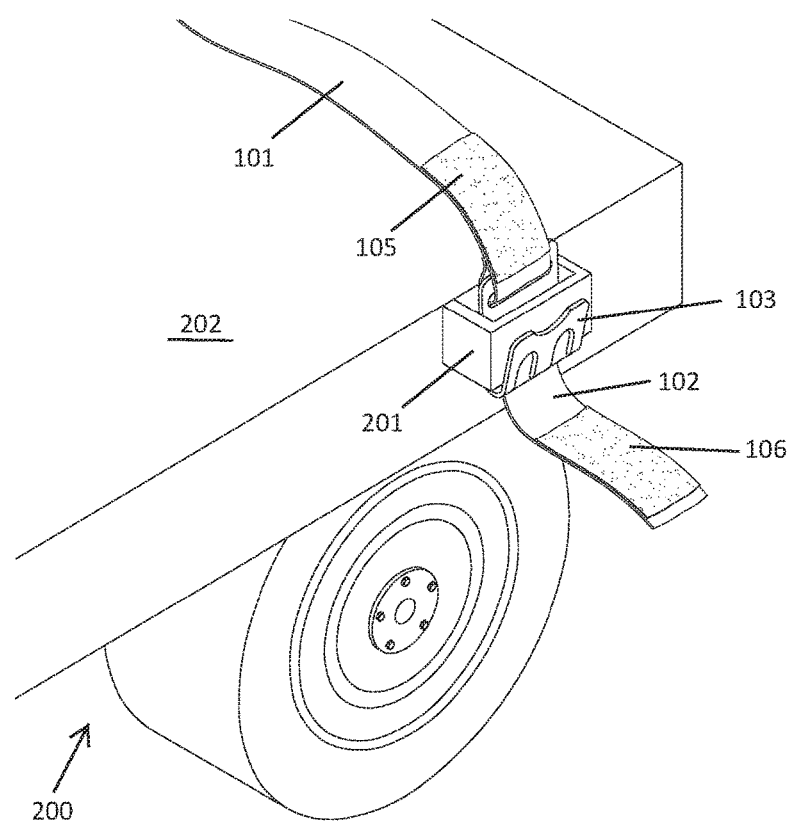
FIG. 3 is a partial perspective view an anchor point holder of a vehicle with the strap assembly of FIG. 1 in the opened position.

FIG. 3 shows a preferred embodiment of a tie down strap 100 opened as it is being passed through the anchor point 201 of a vehicle 200. The fastening hook 103 is releasably attached to the anchor point 201. The anchor point 201 is attached to the vehicle 200. The tie down strap 100 is passed over a bed 202 of the vehicle. The tie down strap 100 can be connected to a second anchor point, which is not shown.

The union of the tie down strap 100 and the anchor point 201 is necessary to secure cargo (which isn't shown) on the vehicle 200. The lateral strap 102 and fastening hook 103 are looped through the anchor point 201. The fastening hook 103 is used to cuff the anchor point 201. The hook-and-loop fastener sold under the trademark VELCRO 105 secured to the medial strap 101 is directionally above and is exposed to the surface away from the vehicle 200. The hook-and-loop fastener 106 secured to the lateral strap 102 is directionally extended away from the vehicle 200.

Figure 4:
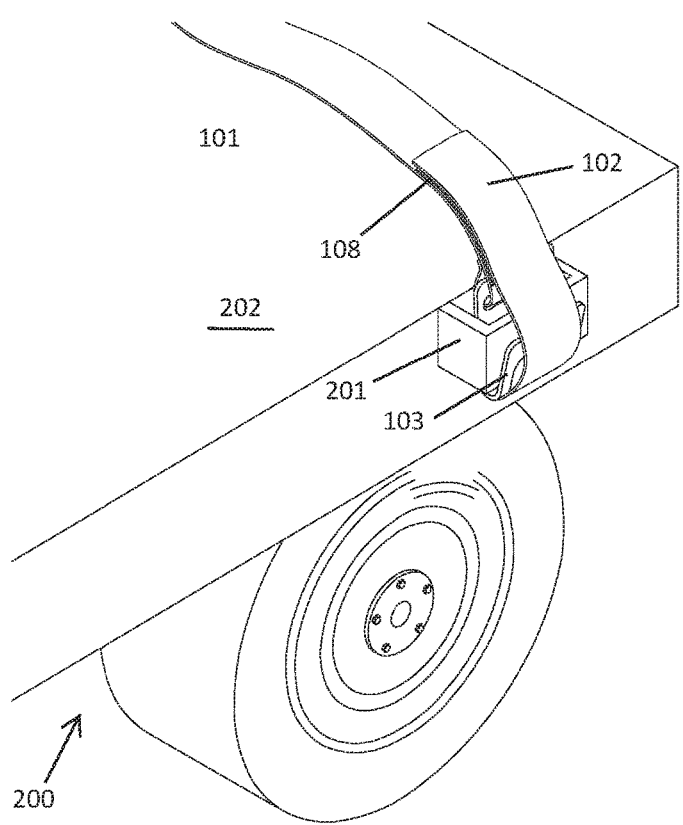
FIG. 4 is a partial perspective side view of the vehicle shown in FIG. 3 with the strap assembly in the closed position.
Figure 5:
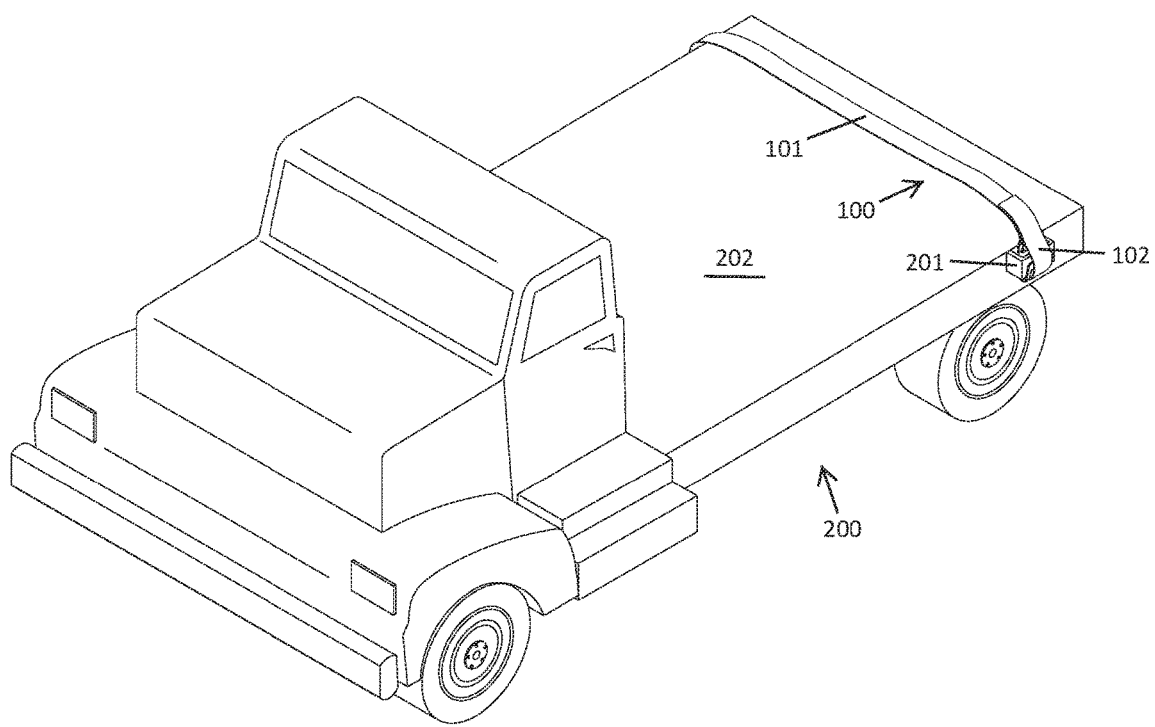
FIG. 5 is a perspective view of the vehicle with the strap assembly attached at both ends.

FIG. 4 shows the tie down strap 100 closed through the anchor point 201 of the vehicle 200. The pairing of the fastening hook 103 and the anchor point 201 secures cargo onto the vehicle 200. The pairing of the fastening hook 103 and the anchor point 201 is maintained through creating a shared edge 108 between fastening system. The fastening system shared edge 108 is created through the union of the hook-and-loop fastener 105 secured to the medial strap 101 and the hook-and-loop fastener 106 secured to the lateral strap 102.

The union of the tie down strap 100 and the anchor point 201 is necessary to secure the cargo on the vehicle 200. The fastening hook 103 of the tie down strap 100 creates the union with the anchor point 201. The fastening hook 103 is held to the anchor point 201 by forming the shared edge 108 between the hook-and-loop fastener 105 and the hook-and-loop fastener 106. The lateral strap 102 is looped upwards toward the medial strap 101 and the hook-and-loop fastener 105 and the hook-and-loop fastener 106 are joined. The tie down strap 100 creates a looping system by which the fastening hook 103 and the anchor point 201 are prevented from unintentionally disjoining.

The removal of the tie down strap 100 from the anchor point 201 is first completed by disjoining the hook-and-loop fastener 105 and the hook-and-loop fastener 106. To disjoin, the lateral strap 102 must be pulled in a downward/outward direction away from the vehicle 200. Upon disjoining hook-and-loop fastener 105 and hook-and-loop fastener 106, the fastening hook 103 must be directed downward and away from the anchor point 201. The fastening hook 103 should no longer be cuffing the anchor point 201 and should then be directed backward through the anchor point 201 toward the vehicle 200. For complete removal of the tie down strap 100 from the vehicle 200 the same steps must be taken at any point where the tie down strap 100 has been secured around an anchor point 201.

FIG. 5 shows a preferred embodiment of a vehicle 200 utilizing the tie down strap 100. The vehicle 200 has an anchor point 201 with the tie down strap 100 attached.

The vehicle 200 with anchor point 201 and the tie down strap 100 create a secured platform to hold cargo. The tie down strap 100 utilizes both the medial strap 101 and the lateral strap 102 to join with the anchor point 201. The anchor point 201 can be located along the length of the vehicle 200 without diminishing performance of the tie down strap 100.

Unless otherwise mentioned the reference numbers are used consistently throughout the figures.

What is claimed is:

1. A tie down strap for securing cargo, comprising:
    a medial strap for overlying the cargo, said medial strap having an end;
    a hook for attaching to an anchor being connected to said end of said medial strap, said hook having a lip with a height; and
    a lateral strap having a first end and a second end, said first end of said lateral strap being connected to said medial strap, and said second end of said lateral strap being releasably connected to said medial strap, said lateral strap defining a loop when said first end of said lateral strap and said second end of said lateral strap are connected to said medial strap, said loop being configured to connect to the anchor when said hook is connected to the anchor, said loop having a diameter, said diameter of said loop being less than said height of said lip of said hook.

2. The tie down strap according to claim 1, further comprising:
    a fastener being disposed on said lateral strap, said fastener being configured to connect said lateral strap to said medial strap, to disconnect said lateral strap and said medial strap, and to reconnect said lateral strap to said medial strap.

3. The tie down strap according to claim 1, further comprising:
    a first component of a hook and loop faster being disposed on said medial strap; and
    a second component of said hook and loop fastener being disposed on said lateral strap, said second component adhering to said first component when forming said loop.

4. The tie down strap according to claim 1, wherein:
    said hook has an eye formed therein; and
    said medial strap forms a loop threaded through said hook.

5. The strap assembly according to claim 1, wherein said hook is a flat hook.

6. The strap assembly according to claim 1, wherein said hook is a wire hook.

7. The strap assembly according to claim 1, wherein at least one of said medial strap and said lateral strap is made from synthetic fibers.

8. The strap assembly according to claim 7, wherein said synthetic fibers are polyester fibers.

9. The strap assembly according to claim 7, wherein said synthetic fibers are nylon.

10. The strap assembly according to claim 1, wherein said medial strap and said lateral strap are composed of a same material.

11. The strap assembly according to claim 1, wherein said medial strap and said lateral strap are composed of different materials.

12. The strap assembly according to claim 1, wherein said loop formed by said lateral strap is not strong enough to support a load of the cargo.

* * * * *